(12) United States Patent
Fujii et al.

(10) Patent No.: US 6,778,777 B1
(45) Date of Patent: Aug. 17, 2004

(54) CAMERA

(75) Inventors: Naoki Fujii, Hachioji (JP); Yasuo Asakura, Hachioji (JP)

(73) Assignee: Olympus Optical Company, Ltd., Tokyo (JP)

( * ) Notice: Subject to any disclaimer, the term of this patent is extended or adjusted under 35 U.S.C. 154(b) by 98 days.

(21) Appl. No.: 09/694,944

(22) Filed: Oct. 24, 2000

(30) Foreign Application Priority Data

Nov. 24, 1999 (JP) .............................................. 11-333235
Sep. 27, 2000 (JP) ........................................ 2000-294539

(51) Int. Cl.⁷ ......................... G03B 17/02; H04N 5/225
(52) U.S. Cl. ...................... 396/535; 396/540; 348/376
(58) Field of Search ............................... 396/176, 178, 396/177, 535, 540, 89, 104, 106, 111, 121; 348/373, 376

(56) References Cited

U.S. PATENT DOCUMENTS 5,028,949 A * 7/1991 Kawano ..................... 396/106
5,623,712 A * 4/1997 Onda et al. ................. 396/424

FOREIGN PATENT DOCUMENTS

| JP | 06082890 | 3/1994 |
|----|----------|--------|
| JP | 08220615 | 8/1996 |
| JP | 08327885 | 12/1996 |
| JP | 11237678 | 8/1999 |

* cited by examiner

*Primary Examiner*—Russell Adams
*Assistant Examiner*—Rochelle Blackman
(74) *Attorney, Agent, or Firm*—Volpe and Koenig, P.C.

(57) ABSTRACT

An electronic camera having therein a CCD (image sensing device). A lens barrel is mounted on a camera body thereof. As focusing means, this camera has therein a ranging unit in an active AF manner and a contrast detector in a contrast AF manner using subject light from the lens barrel. A grip portion is arranged at the left side (as seen from the subject) of the camera body. A peak portion is arranged over the grip portion. A ranging window for the ranging unit is arranged over the peak portion. When the camera body is held, it is possible to prevent fingers from moving to the front of the ranging window and covering the window by the peak portion. Even if the lens barrel has a large aperture, it is also possible to arrange the ranging unit on the front portion of the camera body.

32 Claims, 4 Drawing Sheets

CAMERA

This application claims benefit of Japanese Application No. Hei11-333235 filed in Japan on Nov. 24, 1999 and Japanese Application No. 2000-294539 filed in Japan on Sep. 27, 2000, the contents of which are incorporated by this reference.

BACKGROUND OF THE INVENTION

1. Field of the Invention

The present invention relates to a camera having a ranging unit, or an arrangement thereof.

2. Description of the Related Art

In conventional compact cameras, a ranging unit for active AF (automatic focusing) having therein an IRED (infrared ray emitting diode) and a PSD (position sensitive device) is usually used. In these compact cameras, the aperture of their photographing lenses is relatively smaller and the lens barrel unit is relatively shorter than the size of their camera bodies. Therefore, the position where the above-mentioned ranging unit for AF is mounted is hardly limited and this unit can be arranged at an appropriate position on the front of the cameras. It is necessary that a light beam emitted from the front and a light beam which the front receives are not blocked off by a photographer's hand or the like at the time of ranging.

Conventional electronic cameras in which a CCD, which is an image sensing device whose pixel number is large, is used are high-class cameras suitable for semi-professionals. Therefore, photographing optical systems which have a high zooming ratio and are bright are selected. For this reason, their photographing lens barrel becomes large-sized and long so that the occupation ratio of the photographing lens barrel in the front of the camera body is large and the lens barrel is considerably projected forward from the camera body.

In AF processing of the above-mentioned conventional electronic cameras, a so-called passive contrast AF, as described in the following, has been exclusively used. The position of their focusing lens is changed and then image signals of a subject from their image sensing device are used at every changed position to compare spatial frequencies. In this way, a focusing position is decided.

However, the contrast AF in the above-mentioned conventional electronic cameras is hard to deal with a subject environment having low contrast. That is, in dark places, the contrast therein is greatly lowered; therefore, a contrast peak value, which can cause the lens to be positioned in focus, cannot be detected with sufficient accuracy. Thus, in many cases, the focus of the lens cannot be accurately adjusted. It can be of imagined that in order to compensate for reduced brightness of the subject, an electronic flash bulb for multi-ranging is intermittently set off. However, this manner is impractical.

Even if the brightness of a subject is sufficient, the focus cannot be accurately adjusted in the case that the contrast itself of the subject is insufficient in a focusing area. In the contrast AF at the time of taking a photograph with a high zooming ratio or taking a close-up photograph, an inconvenience that a focusing time becomes long because of a large movement distance of the lens arises.

Incidentally, in the case of conventional electronic cameras into which a ranging unit is integrated wherein a lens barrel is large-sized and long and a camera body does not project at the left hand side of the lens barrel (at the side opposite to a grip), it is difficult that the ranging unit is arranged around the lens barrel of the camera body or at the left side of the camera body.

Furthermore, the lens barrel projects out and the lens barrel is supported by a left hand at the time of taking a photograph; therefore, the space where the ranging unit can be arranged gets smaller in the front of the camera body, as compared with conventional cameras wherein the camera body is held at the left side thereof (as seen from a subject) by a left hand. Thus, it is difficult to arrange the ranging unit.

Hitherto, there have been known no cameras wherein the above-mentioned focusing unit is conveniently arranged in the vicinity of an electronic flash unit.

OBJECT AND SUMMARY OF THE INVENTION

The present invention has been made in order to overcome the above-mentioned inconveniences. Thus, an object of the present invention is to provide a compact camera making it possible to arrange a ranging unit at an appropriate position of a camera body, for example, even if a lens barrel to be mounted has a large aperture, whereby the camera is easy to handle. Another object of the present invention is to provide a camera which makes it possible to select focusing data from a focusing manner by means of the above-mentioned ranging unit or from another focusing manner and take in the data, and which can be made compact.

An aspect of the camera of the present invention is a camera comprising a photographing lens barrel arranged at one end side of a camera body; a grip portion arranged at the other end side in of the camera body and projecting forward from the camera body; a window for a ranging unit, arranged at the upper side of the front face of the camera body and in the camera body between the grip portion and the photographing lens barrel; and a finger-restricting portion arranged in the camera body below the window for the ranging unit, one end portion of the finger-restricting portion being formed to project from the grip portion toward the photographing lens barrel; wherein this finger-restricting portion restricts positions of user's fingers when the user grips the front of the grip portion.

Another aspect of the present invention is an electronic camera having an image sensing device for converting a subject image made by the photographing lens barrel photoelectrically, the electronic camera comprising a photographing lens barrel arranged at one end side of a camera body; a grip portion arranged at the other end side of the camera body and projecting forward from the camera body; a window for a ranging unit, arranged at the upper side of the front face of the camera body and in the camera body between the grip portion and the photographing lens barrel; and a finger-restricting portion arranged in the camera body below the window for the ranging unit, one end portion of the finger-restricting portion being formed to project from the grip portion toward the photographing lens barrel; an active type first focusing means disposed correspondingly to the window for the ranging unit; a contrast type second focusing means for outputting focusing signals by use of subject light projected into the image sensing device; and a control means, wherein the control means selects and controls either one of the first focusing means and the second focusing means on the basis of a subject state and a photographing state.

Other features and advantages of the present invention will become clear from the following description.

DETAILED DESCRIPTION OF THE PREFERRED EMBODIMENT

Referring to the attached drawings, embodiments of the present invention will be described hereinafter.

Figure 1:
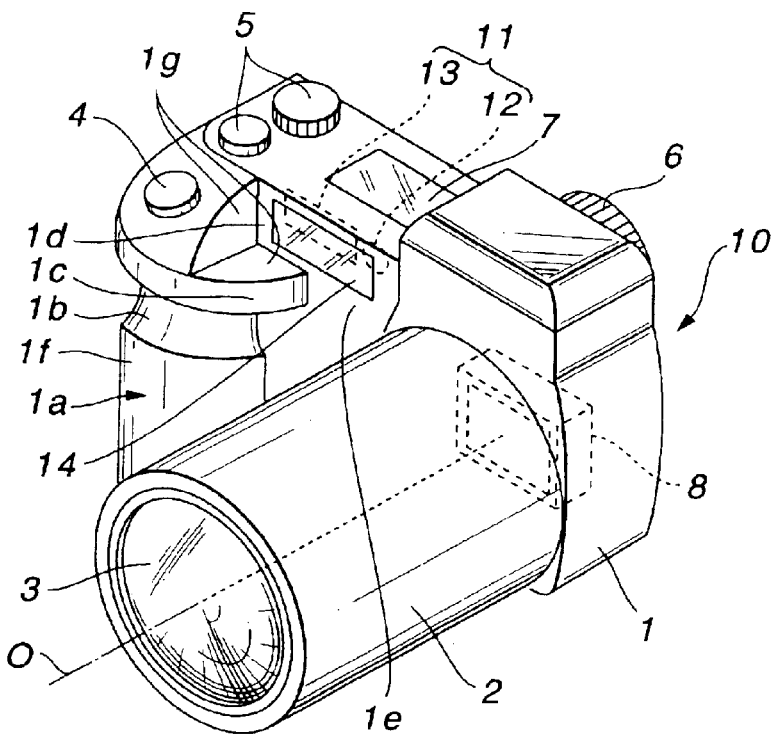
FIG. 1 is a perspective view of an electronic camera of a first embodiment of the present invention.
Figure 2:
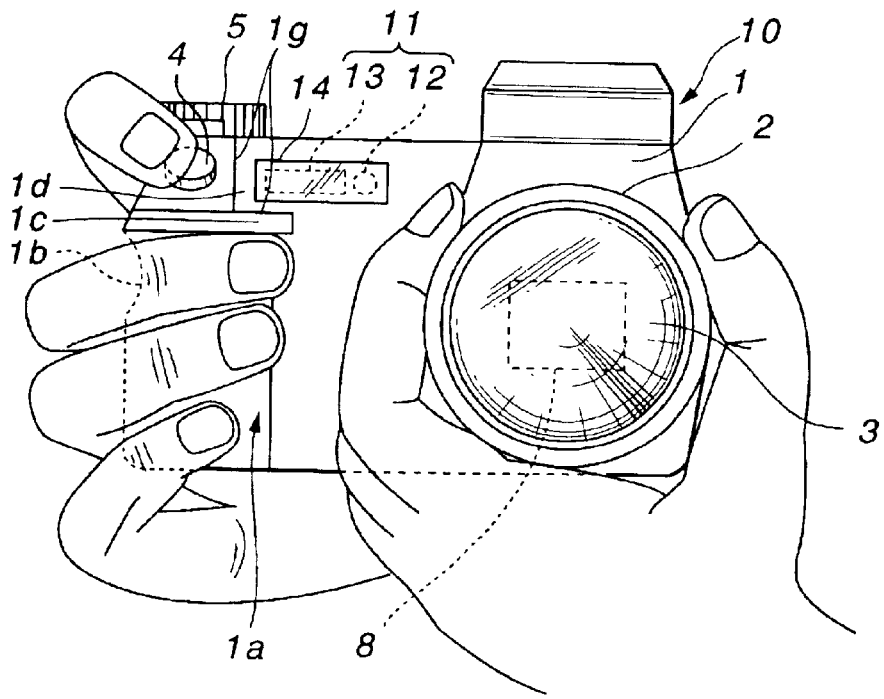
FIG. 2 is a front view of the electronic camera of the first embodiment that is held when a photograph is taken.

FIG. 1 is a perspective view of an electronic camera of a first embodiment of the present invention. FIG. 2 is a front view of this electronic camera that is held when a photograph is taken. In the undermentioned description, the right side and left side of the camera represent the sides when seen from the front side of a lens (from the side of a subject).

The electronic camera 10 of the present embodiment is an electronic camera having therein a CCD 8 as an image sensing device. A grip portion 1a is arranged at the left side of a camera body 1. A photographing lens barrel unit (hereinafter referred to as a lens barrel unit), which projects out at the right side and has a large aperture, is arranged at the right side of the camera body 1. The camera body 1 has no projecting portion on the right side of the lens barrel unit 2.

Therefore, in the case that the present camera 10 is held by a photographer when a photograph is taken, the photographer holds the camera in such a manner that the circumference and the bottom of the lens barrel unit 2 are gripped by the left hand and the grip portion 1a is gripped by the right hand, as shown in FIG. 2.

In the electronic camera 10 of the present embodiment, a release switch button 4, an operations switch button 5 through which operations, such as setup of a mode, are performed, and an LCD display portion 7 are arranged at the upper side of the grip portion 1a side of the camera body 1. An eyepiece unit 6 of a finder is arranged at the upper side of the lens barrel unit 2 side of the camera body 1.

The grip 1a has a semicirculer convex grip front portion 1f, a finger-receiving concave portion 1b positioned at the upper portion of the front portion, and a curved, convex peak portion 1c whose right-hand portion extends further to the right and further toward the lens barrel 2, than the right-hand end of the finger-receiving concave portion 1b and the semi-circular convex grip front portion 1f. The peak portion 1c functions as a finger restricting portion for restricting upward movement of a finger engaging the finger receiving concave portion 1b. A grip upper front portion 1d, located above the peak portion 1c, is cut into the convex surface surrounding button 4 wherein a portion thereof adjacent to the front of the camera body 1 is cut away to provide clearance for ranging window 14. The grip upper right cut-away portion 1d is defined by a plane perpendicular to an optical axis 0 of the photographing lens, and the face 1e containing ranging window 14. The concave portion 1g is formed by removing a right-hand portion of the convex surface surrounding button 4, to form the grip upper front portion 1d, which is a plane substantially perpendicular to the optical axis 0.

A ranging window (window for the ranging unit) 14 is fitted up into a front portion 1e of the camera body 1 in the state that a part of the window 14 invades into the cut-off concave portion 1g of the grip upper front portion 1d. A ranging unit 11, which is a detector in an active AF manner as a first focusing means, is arranged inside the ranging window 14.

The ranging unit 11 is composed of an IRED 12, which is an infrared ray emitting element (light projecting means), and a PSD 13, which is a position sensitive element (light receiving means). The light which is emitted from the IRED 12 and then reflected on a subject is projected onto the PSD 13 and then data on the distance from the subject to the lens is measured on the basis of a trigometrical survey.

The lens barrel unit 2 has therein a photographing lens 3 which has an optical axis 0 and can be focusing-driven. The CCD 8, which is an image sensing device, and a controller are arranged behind the photographing lens 3. An image of the subject taken in through the photographing lens 3 is photoelectrically converted to electrical signals(image signals) by means of the CCD 8 and then taken in the controller having therein a CPU and the like.

A contrast detector in a focus detecting manner, as a second focusing means, which the above-mentioned controller has therein detects data on the contrast of the subject on the basis of the image signals of the taken-in subject image so as to focusing-drive the photographing lens 3 by automatic focusing processing in the contrast AF manner.

The controller focusing-drives the photographing lens 3 onto a focusing position on the basis of either of the data on the distance from the subject detected by means of the ranging unit 11 or the data on the focusing position detected by means of the contrast detector.

In the electronic camera 10 having the above-mentioned structure, whether the AF processing in the ranging manner by means of the ranging unit 11 or the contrast AF manner by means of the contrast detector is adopted as the AF (automatic focusing) processing of the photographing lens is selected automatically or manually depending on the state of the subject, photographing conditions and the like. The above-mentioned state of the subject is a state that the brightness of the subject is high or low, or a state that the subject has a high contrast or a low contrast. The above-mentioned photographing conditions are conditions as to whether a photograph is taken with a high zooming ratio or not, whether photographing at close range is taken or not, and the like.

In the case that the brightness of the subject is high or the like case, on the basis of the image signals of the subject image, which are obtained through the CCD 8, contrast data are detected in the above-mentioned contrast detector to drive the photographing lens 3 to a focusing position.

On the other hand, in the case that the brightness of the subject is low or the like case, a ranging beam is projected from the IRED 12 to the subject through the ranging window 14, and then the PSD 13 receives a resultant reflection beam. The controller calculates the distance to the subject from a position where the reflection beam has been received. The photographing lens 3 is driven up to a focusing position corresponding to the distance from the subject.

The image signals of the subject image obtained by means of the CCD 8 in the above-mentioned lens-focused state are image-processed in the controller, and then the image-processed signals are stored as photographed-image data in a memory.

In the electronic camera 10 of the first embodiment, automatic focusing can be attained by the contrast AF processing or the ranging processing by means of the ranging unit. In the case that accurate and speedy focusing operation cannot be attained by the contrast AF processing, depending on the state of the brightness of the subject or photographing conditions, the contrast AF processing is switched to the ranging processing by means of the ranging unit, so as to adjust the focus.

However, in the case that the lens barrel unit 2 has a large aperture, camera body 1 has no projecting portion on the right side of the barrel unit 2. Thus, the space where the ranging unit 11 and the ranging window 14 are arranged is limited to the upper side of the grip portion 1a.

Thus, in the electronic camera 10 of the present embodiment, the ranging window 14 is fitted to the front portion 1e of the camera body by cutting off the grip upper front portion 1d as described above. Furthermore, the peak portion 1c for restricting the movement of the finger toward the upper end of the grip portion 1a is formed so that the cover of the ranging window 14 with the fingers of the right hand is prevented when the camera body 1 is held as shown in FIG. 2. Accordingly, it is possible to detect with certainty the distance from the subject by the automatic focusing by means of the ranging unit 11 rather than the contrast AF. As a result, photographs can easily be taken.

In the electronic camera 10 of the first embodiment, the ranging window 14 is arranged at the cut-away portion in the grip upper front portion 1d over the peak portion 1c. However, if the ranging window 14 is arranged at a portion which is not cut away in the grip upper front portion 1d, the same advantages can be obtained.

In the electronic camera 10 of the first embodiment, the cut-away concave portion 1g in the grip upper front portion 1d is defined by horizontally and vertically aligned planes parallel to the photographing optical axis 0. However, if this cut-away concave portion 1g has a vertically aligned plane which forms a slightly greater angle with the optical axis and is somewhat inclined, ranging ability can be improved.

Figure 3:
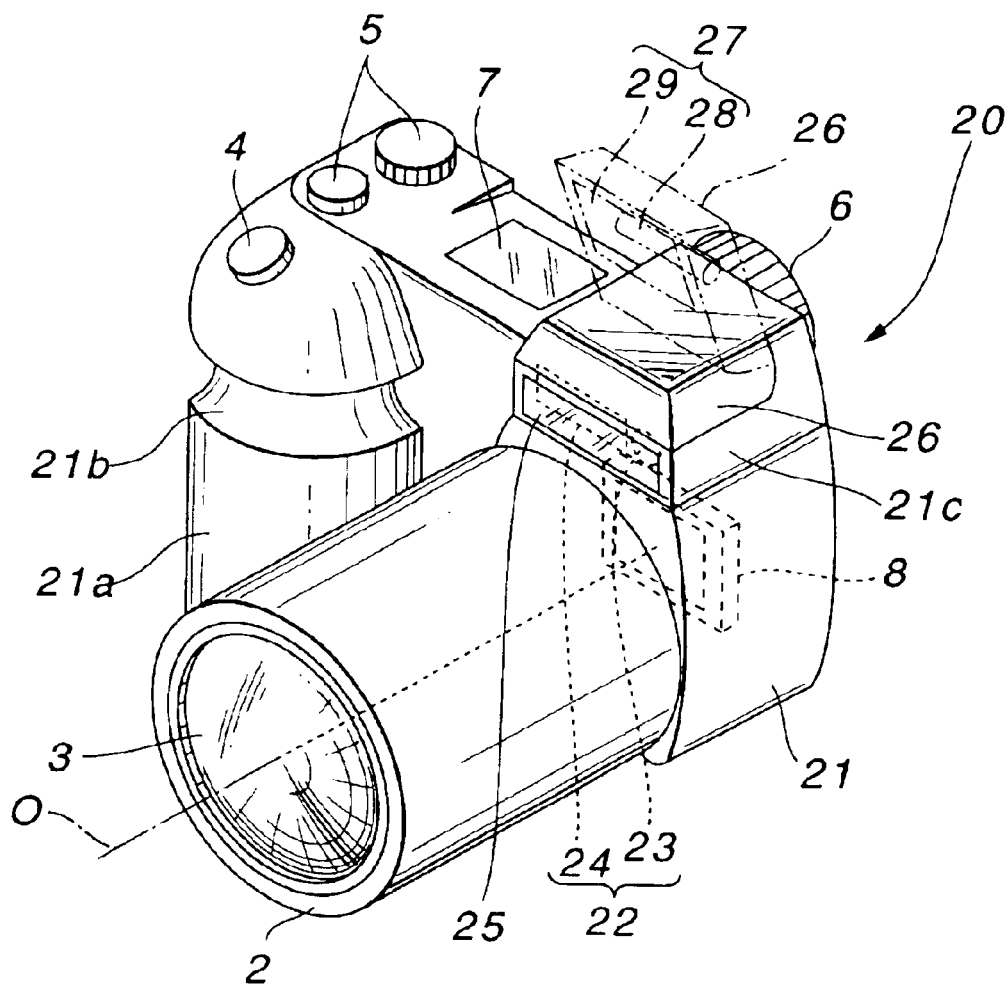
FIG. 3 is a perspective view of an electronic camera of a second embodiment of the present invention.

FIG. 3 is a perspective view of the electronic camera of the second embodiment of the present invention. This electronic camera 20 is different from the electronic camera 10 of the first embodiment in that its ranging unit is arranged at a different location. In the camera 20, an electronic flash unit is arranged near the ranging unit. Other elements and structures are the same as in the first embodiment, and the same reference numbers are attached to them. Hereinafter, different elements and structures will mainly be described.

In the electronic camera 20 of the second embodiment, in the same way, a photographing lens 3 having a large aperture is arranged in a lens barrel unit 2. The right side of the camera body 21 has no projecting portions. In a grip portion 21a at the left side of the camera body 21, a finger-receiving concave portion 21b is provided.

In the same way as in the first embodiment, a release switch button 4, and operation switch buttons 5 through which operations, such as setup of a mode, are performed, and an LCD display portion 7 are arranged at the upper side of the grip portion 21a side of the camera body 21 of the electronic camera 20. An upper projecting portion 21c is made in the camera body 21 behind the lens barrel unit 2.

A ranging unit 22 and a ranging window (a window for the ranging unit) 25 are arranged at the lower front of the projecting portion 21c. An electronic flash lid 26, which has therein an electronic flash unit 27 and can be opened and closed, is arranged at the upper front of the projecting portion 21c. Moreover, a finder eyepiece unit 6 is fitted to the back face of the projecting unit 21c.

The ranging unit 22 is a detector in an AF manner as a first focusing means. The unit 22 is composed of an IRED 23, which is an infrared ray emitting element as a light projecting means, and a PSD 24, which is a position detecting element as a light receiving means. The unit 22 can detect data on the distance from a subject on the basis of a trigometrical survey.

The electronic flash unit 27 which the electronic flash lid 26 has therein comprises an electronic flash window 29, an electronic flash emitting tube 28, and the like. When the electronic flash lid 26 is at a storage position (closed position), the electronic flash unit 27 is stored onto the upper side of the position where the ranging unit 22 is arranged. When the electronic flash lid 26 stands up (opens), the electronic flash unit 27 moves to a popup position at which flash unit 27 can emit light.

The lens barrel unit 2 has therein a photographing lens 3 which can be focusing-driven in the same way as the electronic camera 10 of the first embodiment. A CCD 8, which is an image sensing device, and a controller are arranged behind the photographing lens 3 and inside the camera body 21. Data on a subject image, which are photoelectrically converted to electric signals (image signals) in the CCD 8, are taken in the controller having therein a contrast detector.

In the present electronic camera 20 having the above-mentioned structure, focusing processing is performed in the same way as the electronic camera 10 of the first embodiment. In the electronic camera 20, the electronic flash lid 26 can be opened to bring the electronic flash unit 27 into a popup state. In this way, the electronic flash window 29 is exposed so that a photograph can be taken with flashlight.

According to the electronic camera 20 of the second embodiment, as an automatic focusing manner, the ranging processing by means of the ranging unit or the contrast AF processing can be selected, depending on the state of the brightness of a subject or photographing conditions, in the same way as the electronic camera 10 of the first embodiment. Accurate and speedy focusing operation can be attained. In the present electronic camera 20, the ranging unit 22 and the electronic flash unit 27 are combined and they are fitted to the upper projecting portion 21c, behind the lens barrel unit 2, of the camera body 21. Thus, the space of the camera body 21 can be put to good use. As a result, the camera, in particular the front of the camera body, can be made compact.

In the state that the lens barrel unit 2 is held by the left hand and the grip portion 21a of the camera body is held by the right hand when a photograph is taken, the ranging window 25 of the ranging unit 22 is not covered with the fingers so that focusing can be reliably performed.

The following will describe various variations of the position where the ranging unit is arranged in the electronic camera of the second embodiment.

Figure 4:
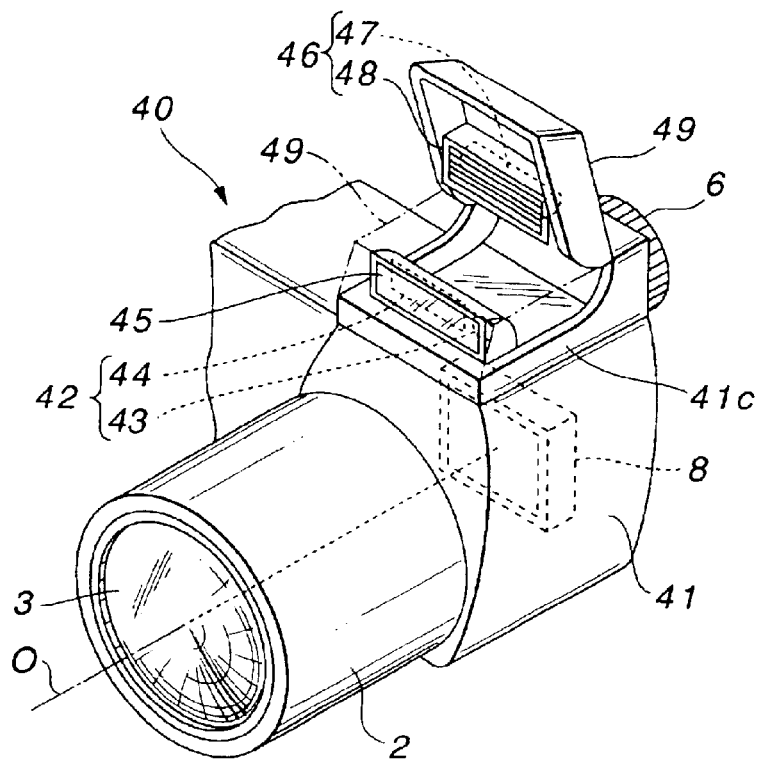
FIG. 4 is a perspective view of important elements of an electronic camera wherein a first modification is applied to a ranging unit used in the electronic camera of the second embodiment.

FIG. 4 is a perspective view of important elements of an electronic camera wherein a first modification of the above-mentioned ranging unit is used. In this electronic camera 40, an upper projecting portion 41c is made on a camera body 41 and behind the lens barrel unit 2 of the electronic camera 20.

An electronic flash lid 49, which can cover the upper side of the projecting portion 41c and can be rotatably opened and closed, is fitted to the projecting portion 41c. A ranging unit 42 and a ranging window (window for the ranging unit) 45 are arranged over the projecting portion 41c and at the front inside an area which is covered with the electronic flash lid 49 in a storage state (lid-closed state). An electronic flash unit 46 is integrally held in the electronic flash lid 49 and located at a position where this unit 46 is displaced from the ranging unit 42 in the lid-closed state. A finder eyepiece unit 6 is arranged at the back side of the projecting portion 41c.

The ranging unit 42 is composed of an IRED 43, which is an infrared ray emitting element (light projecting means) as an active AF detector of a first focusing means, and a PSD 44, which is a position detecting element (light receiving means). The ranging unit 42 determines distance from a subject on the basis of a trigonometric survey. When the electronic flash lid 49 is at an open position, the ranging window 45 at the front of the ranging unit 42 is exposed so that focusing can be performed.

The electronic flash unit 46 comprises an electronic flash window 48, an electronic flash emitting tube 47, and the like. When the electronic flash lid 49 stands up to be at an open position, the front of the electronic flash window 48 is exposed and opened toward a subject so that electronic flash can be attained.

Other structures are the same as in the electronic camera 20 of the second embodiment, and the same reference numbers are attached thereto in FIG. 4. For example, the lens barrel unit 2 has therein the photographing lens 3 which can be focusing-driven and has a large aperture. The CCD 8, which is an image sensing device, and the controller are arranged inside the camera body 4 and behind the photographing lens 3.

In the present electronic camera 40 having the above-mentioned structure, in the state that the electronic flash lid 49 is opened, focusing processing is performed in the same way as the electronic camera 20 of the second embodiment. The electronic flash unit 46 is also in the state that light can be emitted, so that a photograph can be taken with flashlight.

According to the electronic camera 40 wherein the first variation is used, the same effects as the electronic camera 20 of the second embodiment can be produced. Since the ranging window 45 is covered with the electronic flash lid 49 in a normal state, particularly certain protection against dust and the like can be attained. Moreover, the upper portion of the camera body 41 can be made compact since the electronic flash unit 46 and the ranging unit 42 are stored in the electronic flash lid 49.

Figure 5:
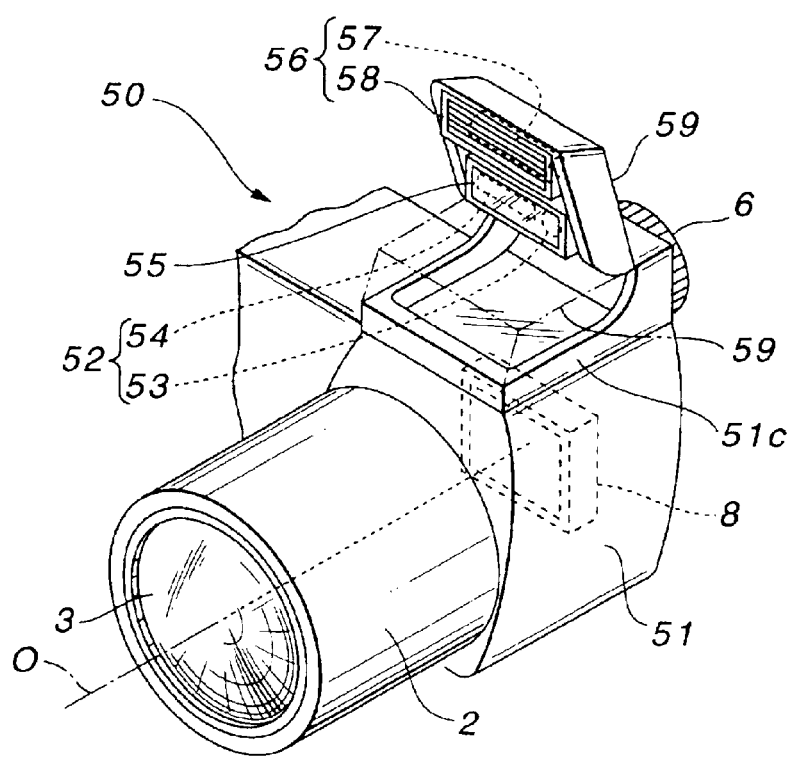
FIG. 5 is a perspective view of important elements of an electronic camera wherein a second modification is applied to a ranging unit used in the electronic camera of the second embodiment.

FIG. 5 is a perspective view of important elements of an electronic camera wherein a second modification of the arrangement of the above-mentioned ranging unit 22 is used. In this electronic camera 50 wherein the present variation is used, a projecting portion 51c is made on a camera body 51 and behind the lens barrel unit 2 in the same manner as the electronic camera 20.

An electronic flash lid 59, which can cover the upper side of the projecting portion 51c and can be rotatably opened and closed, is fitted to the projecting portion 51c. The electronic flash lid 59 supports a ranging unit 52, a ranging window (window for the ranging unit) 55, and an electronic flash unit 56, which is positioned over the ranging window 55, together.

The ranging unit 52 is composed of an IRED 53, which is an infrared ray emitting element (light projecting means) as an active AF detector of a first focusing means, and a PSD 54, which is a position sensitive element (light receiving means). The ranging unit 52 can detect data on the distance from a subject on the basis of trigometrical survey.

The electronic flash unit 56 comprises an electronic flash window 58, an electronic flash emitting tube 57, and the like. When the electronic flash lid 59 stands up to be at an open position, both of the ranging window 55 and the electronic flash window 58 are exposed so that ranging and electronic flash can be attained.

Other structures are the same as in the electronic camera 20 of the second embodiment, and the same reference numbers are attached thereto in FIG. 5. For example, the lens barrel unit 2 has therein the photographing lens 3 which can be focusing-driven and has a large aperture. The CCD 8, which is an image sensing device, the controller, the contrast detector and the like are arranged inside the camera body 51 and behind the photographing lens 3.

In the present electronic camera 50 having the above-mentioned structure wherein the present variation is used, in the state that the electronic flash 59 is in the open position shown in FIG. 5, focusing processing by means of either the ranging unit 52 or the contrast detector is selected so that the photographing lens 3 is focus in given in the same way as in the case of the electronic camera 20 of the second embodiment. When the electronic flash lid 59 is in the open position, the electronic flash unit 56 is in a popup state so that a photograph can be taken with flashlight.

According to the electronic camera 50 wherein the present variation is used, the same effects as the electronic camera 20 of the second embodiment and the electronic camera 40 wherein the first variation is used can be produced. Since the ranging unit 52 and the electronic flash unit 56 are integrated into the electronic flash lid 59, the ranging unit 52 and the electronic flash unit 56 can be made particularly compact. Thus, the present embodiment has a remarkable advantage for making the camera more compact.

Figure 6:
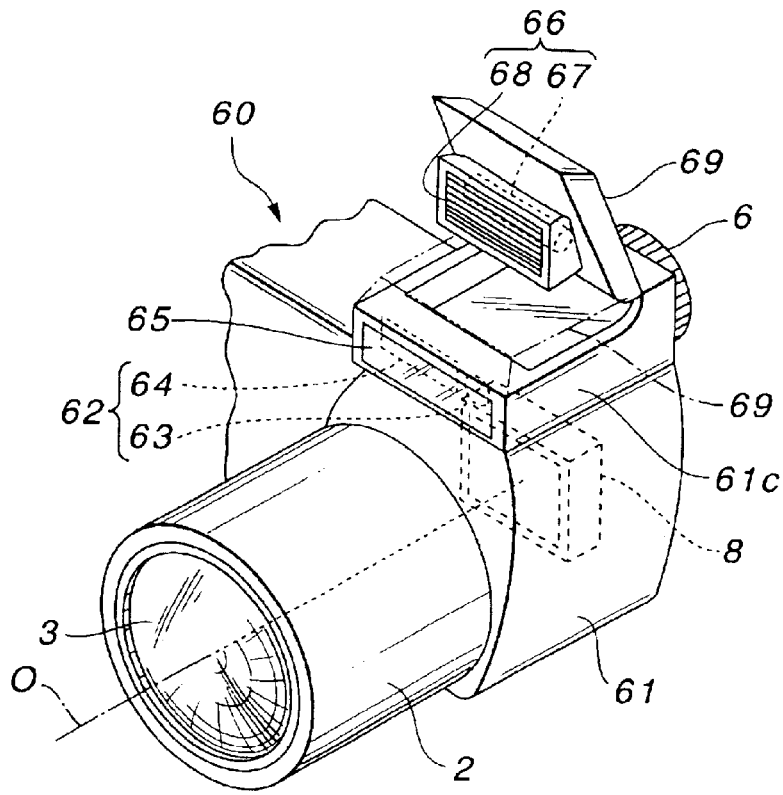
FIG. 6 is a perspective view of important elements of an electronic camera wherein a third modification is applied to a ranging unit used in the electronic camera of the second embodiment.

FIG. 6 is a perspective view of important elements of an electronic camera wherein a third modification of the arrangement of the above-mentioned ranging unit 22 is used. In this electronic camera 60, a projecting portion 61c is made on a camera body 61 and behind the lens barrel unit 2 in the same manner as the electronic camera 20. An electronic flash lid 69, which can cover the upper side of the projecting portion 61c and can be rotatably opened and closed, is fitted to the projecting portion 61c. A finder eyepiece unit 6 is arranged at the back side of the projecting portion 61c.

A ranging window (window for a ranging unit 62) 65 is arranged, in the state that this window is not covered with the electronic flash lid 69, at the front of the projecting portion 61c. An electronic flash unit 66 is fixed to the electronic flash lid 69.

The ranging unit 62 is positioned inside and behind the ranging window 65. The ranging unit 62 is composed of an IRED 63, which is an infrared ray emitting element (light projecting means) as an active AF detector of a first focusing means, and a PSD 64, which is a position sensitive element (light receiving means).

The electronic flash unit 66 comprises an electronic flash window 68, an electronic flash emitting tube 67 and the like, and the unit 66 is fixed to the electronic flash lid 69. When the electronic flash lid 69 is rotated to a storage position (lid-closed position), the electronic flash unit 66 is stored behind the ranging unit 62. When the electronic flash lid 69 stands to be at an open position, the electronic flash window 68 is exposed so that electronic flash can be emitted.

Other structures are the same as in the electronic camera 20 of the second embodiment, and the same reference numbers are attached thereto in FIG. 6. For example, the lens barrel unit 2 has therein the photographing lens 3 which can be focusing-driven and has a large aperture. The CCD 8, which is an image sensing device, the controller, the contrast detector and the like are arranged inside the camera body 61 and behind the photographing lens 3.

In the present electronic camera 60 having the above-mentioned structure wherein the present variation is used, in the state that the electronic flash lid 69 is in the open position shown in FIG. 6, focusing processing by means of either the ranging unit 62 or the contrast detector is selected so that the photographing lens 3 is focused in the same way as in the case of the electronic camera 20 of the second embodiment. When the electronic flash lid 69 is in the open position, the electronic flash unit 66 is in a popup state so that a photograph can be taken with flashlight.

According to the electronic camera 60 wherein the third variation is used, the same effects as the electronic camera 20 of the second embodiment and the electronic camera 40 wherein the first variation is used can be produced. The upper portion of the camera body 61 can be made particularly compact since the electronic flash unit 66 and the ranging unit 62 are stored in the projecting portion 61c of the camera body.

Figure 7:
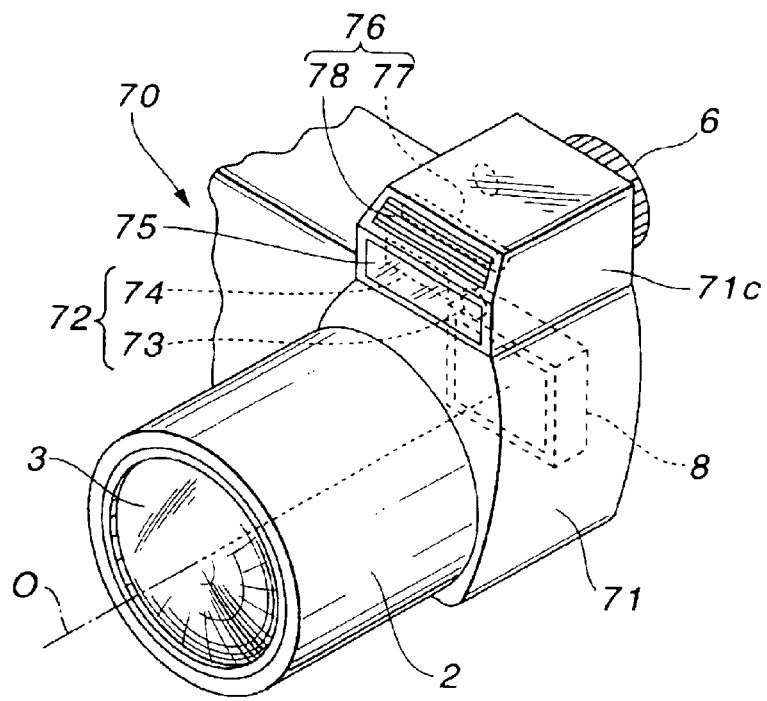
FIG. 7 is a perspective view of important elements of an electronic camera wherein a fourth modification is applied to a ranging unit used in the electronic camera of the second embodiment.

FIG. 7 is a perspective view of important elements of an electronic camera wherein a fourth modification of the arrangement of the above-mentioned ranging unit 22 is used. In this electronic camera 70 wherein the present variation is used, a projecting portion 71c is made on a camera body 71 and behind the lens barrel unit 2 in the same manner as the electronic camera 20.

A ranging unit 72 and a ranging window (window for the ranging unit) 75 are fixed to the lower front of the projecting portion 71c and an electronic flash unit 76 is fixed to the upper front of the projecting portion 71c. A finder eyepiece unit 6 is arranged at the back side of the projecting portion 71c.

The ranging unit 72 is composed of an IRED 73, which is an infrared ray emitting element (light projecting means) as an active AF detector of a first focusing means, and a PSD 74, which is a position sensitive element (light receiving means). The electronic flash unit 76 comprises an electronic flash window 78, a stopper light emitting tube 77, and the like.

Other structures are the same as in the electronic camera 20 of the second embodiment, and the same reference numbers are attached thereto in FIG. 7. For example, the lens barrel unit 2 has therein the photographing lens 3 which can be focusing-driven and has a large aperture. The CCD 8, which is an image sensing device, the controller, the contrast detector and the like are arranged inside the camera body 71 and behind the photographing lens 3.

In the present electronic camera 70 having the above-mentioned structure wherein the present variation is used, focusing processing by means of either the ranging unit 72 or the contrast detector is selected so that the photographing lens 3 is focused in the same way as in the case of the electronic camera 20 of the second embodiment.

According to the electronic camera 70 wherein the fourth variation is used, the same effects as the electronic camera 20 of the second embodiment and the electronic camera 40 wherein the first variation is used can be produced.

The ranging unit in the above-mentioned embodiments and variations may be any unit wherein an element other than the IRED and the PSD is used if the ranging unit is of an active AF type.

The same advantages, which compensates for weak points of the contrast AF manner, can also be produced by using a ranging unit in a phase difference passive AF manner or the like manner instead of the ranging unit in the active AF manner.

As described above, according to the camera of the present invention, the ranging unit can be arranged onto the front of the camera body even if a lens barrel to be mounted has a large aperture. Moreover, it is possible to provide a compact camera making certain focusing possible without covering the ranging unit with fingers of the hand by which the camera is held. It is also possible to select focusing data not only from the focusing manner by means of the ranging unit but also from another focusing manner and then take in the data. Thus, it is possible to perform more accurate focusing for a wider range of subject conditions, and make the camera compact.

What is claimed is:

1. A camera, comprising:
    a photographing lens barrel arranged at one end side of a camera body,
    a grip portion arranged at another end side of the camera body and projecting forward from the camera body,
    a window for a ranging unit, arranged at an upper side of a front face of the camera body and in the camera body between the grip portion and the photographing lens barrel, and
    a finger-restricting portion arranged in the camera body below the window for the ranging unit, one end portion of the finger-restricting portion being formed to project from the grip portion toward the photographing lens barrel,
    wherein said finger-restricting portion restricts positions of a user's fingers when the user grips a front portion of the grip portion.

2. The camera according to claim 1,
    wherein at least one portion of the window for the ranging unit, positioned at one side of the grip portion, is arranged over the finger-restricting portion projecting toward a side of the photographing lens barrel adjacent to said finger-restricting portion.

3. The camera according to claim 1,
    wherein a cut-off portion having a plane substantially parallel to a plane perpendicular to an optical axis of the photographing lens is positioned near a portion projecting toward an adjacent side of the photographing lens barrel in the finger-restricting portion, and the window for the ranging unit is arranged so that one portion thereof invades into the cut-off portion.

4. The camera according to claim 1,
    which comprises a first focusing means disposed correspondingly to the window for the ranging unit, and a second focusing means for outputting focusing signals responsive to subject light projected into the photographing lens barrel.

5. The camera according to claim 1,
    which is an electronic camera having an image sensing device for converting a subject image made by the photographing lens barrel photoelectrically, and
    which further comprises an active type first focusing means disposed correspondingly to the window for the ranging unit, a contrast type second focusing means for outputting focusing signals by use of subject light projected into the image sensing device, and a control means for controlling the first focusing means and the second focusing means responsive to a subject state and a photographing state.

6. The camera according to claim 5, wherein the subject state is subject brightness or contrast, and the photographing state is a photographing state that a zooming ratio is adjusted, or photographing close range state, and the control means selects and controls, on the basis of these, one of the first focusing means and the second focusing means.

7. A camera comprising:
a photographic lens barrel arranged at one end side of a camera body;
a grip portion arranged at the other end side of the camera body and projecting forward from the camera body;
a projecting portion integrated so as to project upward from the upper surface at the side of the one end portion of the camera body, at which the photographing lens barrel is arranged;
a ranging unit in said camera body;
a window for said ranging unit, arranged to be exposed near a base portion of the photographing lens barrel and on a front surface of the projecting portion; and
a movably mounted electronic flash lid which forms one portion of the projecting portion at an upper part of the window for the ranging unit which is arranged to be exposed on the front of the projecting portion, when an electronic flash unit which is supported by the electronic flash lid is closed when not in use, the electronic flash lid being movable to pop up, when the electronic flash unit which is supported by the electronic flash lid is used, the electronic flash unit which is supported by the electronic flash lid being enabled to emit light by popping-up of the electronic flash lid.

8. A camera comprising:
a photographic lens barrel arranged at one end side of a camera body;
a grip portion arranged at the other end side of the camera body and projecting forward from the camera body;
a projecting portion integrated so as to project upward from the upper surface at the side of the one end portion of the camera body, at which the photographing lens barrel is arranged;
a ranging unit in said camera body;
a window for said ranging unit, arranged to be exposed near a base portion of the photographing lens barrel and on a front surface of the projecting portion; and
a movably mounted electronic flash lid which forms one portion of the projecting portion at an upper part of the window for the ranging unit, the electronic flash lid being movable to pop up, when the electronic flash unit which is supported by the electronic flash lid is used, the electronic flash unit which is supported by the electronic flash lid being enabled to emit light by popping-up of the electronic flash lid;
wherein the electronic flash unit is supported by the electronic flash lid making one portion of the projecting portion when the electronic flash unit is not used; the electronic flash lid covers the window for the ranging unit when the electronic flash unit is not used; and the electronic flash lid pops up when the electronic flash unit is used, so as to permit emission of light from the electronic flash unit and focusing.

9. A camera comprising:
a photographing lens barrel arranged at one end side of a camera body;
a grip portion arranged at the other end side of the camera body and projecting forward from the camera body;
a projecting portion projecting upward from an upper surface of the camera body, which is located above the photographing lens barrel;
a ranging unit window arranged to be exposed above a base portion of the photographing lens barrel and on a front of the projecting portion; and
an electronic flash unit arranged to be exposed at the front of the projecting portion and displaced from the ranging unit; wherein the electronic flash unit arranged in the front of the projecting portion is arranged over the ranging unit;
wherein said camera is an electronic camera having an image sensing device for photoelectrically converting a subject image made by the photographing lens barrel, which further comprises:
an active type first focusing means disposed in alignment with the ranging unit window;
a contrast type second focusing means for outputting focusing signals by use of subject light projected into the image sensing device; and
a control means for controlling the first focusing means and the second focusing means on the basis of a subject state and a photographing state.

10. A camera comprising:
a photographic lens barrel arranged at one end side of a camera body;
a grip portion arranged at the other end side of the camera body and projecting forward from the camera body;
a projecting portion integrated so as to project upward from the upper surface at the side of the one end portion of the camera body, at which the photographing lens barrel is arranged;
a ranging unit in said camera body;
a window for said ranging unit, arranged to be exposed near a base portion of the photographing lens barrel and on a front surface of the projecting portion; and
a movably mounted electronic flash lid which forms one portion of the projecting portion at an upper part of the window for the ranging unit which is arranged to be exposed on the front of the projecting portion, when an electronic flash unit which is supported by the electronic flash lid is closed when not in use, the electronic flash lid being movable to pop up, when the electronic flash unit which is supported by the electronic flash lid is used, the electronic flash unit which is supported by the electronic flash lid being enabled to emit light by popping-up of the electronic flash lid;
wherein said camera is an electronic camera having an image sensing device for photoelectrically converting a subject image projected on the image sensing device by the photographing lens barrel; and
which further comprises:
an active type first focusing means disposed behind the ranging unit window;
a contrast type second focusing means for outputting focusing signals responsive to subject light projected into the image sensing device; and
a control means for controlling the first focusing means and the second focusing means on the basis of a subject state and a photographing state.

11. An electronic camera according to claim 10,
wherein the subject state is subject brightness or contrast, and the photographing state is a photographing state that a zooming ratio is adjusted, or photographing at close range state, and the control means selects and controls, on the basis of these, one of the first focusing means and the second focusing means.

12. A camera comprising:
a photographing lens barrel arranged at one end side of a camera body;
a grip portion arranged at the other end side of the camera body and projecting forward from the camera body;
a projecting portion projecting upward from an upper surface of the camera body, which is located above the photographing lens barrel;
a ranging unit window arranged to be exposed above a base portion of the photographing lens barrel and on a front of the projecting portion; and
an electronic flash unit arranged to be exposed at the front of the projecting portion and displaced from the ranging unit;
wherein said camera is an electronic camera having an image sensing device for photoelectrically converting a subject image made by the photographing lens barrel, which further comprises:
an active type first focusing means disposed in alignment with the ranging unit window;
a contrast type second focusing means for outputting focusing signals by use of subject light projected into the image sensing device; and
a control means for controlling the first focusing means and the second focusing means on the basis of a subject state and a photographing state,
wherein the subject state is subject brightness or contrast, and the photographing state is a photographing state that a zooming ratio is adjusted, or photographing at close range state, and the control means selects and controls, on the basis of these, one of the first focusing means and the second focusing means.

13. An electronic camera, comprising:
a camera body;
a photographing lens barrel arranged at one end side of the camera body, the photographing lens barrel having therein a photographing lens which can be focusing-driven;
a grip portion arranged at the other end side of the camera body and projecting forward from the camera body;
an image sensing device arranged behind the photographing lens in the camera body;
a contrast type focusing means for outputting focusing signals by use of subject light projected into the image sensing device;
a projecting portion integrated so as to project upward from an upper surface of the camera body and above the photographing lens barrel;
an active type focusing means in the camera body;
a window for a ranging unit disposed in front of the active type focusing means, serving as the ranging unit, and arranged fixedly at a lower part on a front of the projecting portion;
an electronic flash unit fixedly arranged over the window for said ranging unit; and
a control means for controlling the contrast type focusing means and the active type focusing means on the basis of a subject state and a photographing state.

14. An electronic camera, comprising:
a camera body having a given height;
said lens barrel having a diameter that is at least one-half (½) of the height of the camera body; and lies within a perimeter of a front face of the camera;
a photographing lens barrel arranged adjacent one end of the camera body;
a grip portion arranged adjacent another end of the camera body and projecting forward from a front surface of the camera body;
a window for a ranging unit, arranged along the front surface of the camera body and being positioned between the grip portion and the photographing lens barrel;
a finger-restricting portion arranged in the camera body below the window for the ranging unit, an end portion of the finger-restricting portion projecting away from the grip portion and toward the photographing lens barrel;
a concavity arranged above the finger-restricting portion and being defined by first, second and third planar surfaces, said first surface being a top surface of said finger-restricting portion, said second surface extending upward from said first surface to define an extension of said camera body front surface and said third surface extending upwardly from said first surface and forming an inside corner with said first surface and forming an inside corner with said second surface; and
said ranging unit window being arranged so that at least a portion thereof extends into said concavity.

15. An electronic camera, comprising:
a camera body having a given height;
said lens barrel having a diameter that is at least one-half (½) of the height of the camera body; and lies within a perimeter of a front face of the camera;
a photographing lens barrel arranged at one end of the camera body;
an image sensing device in said camera body for photoelectrically converting a subject image made by the photographing lens barrel;
a contrast type focusing means for outputting focusing signals by use of subject light projected into the image sensing device;
a grip portion arranged at an opposite end of the camera body and projecting outwardly from the camera body;
a window for a ranging unit arranged at an upper side of a front of the camera body and located between the grip portion and the photographing lens barrel;
an active type focusing means arranged behind the ranging unit window;
a finger-restricting portion arranged in the camera body below the window for the ranging unit, one end portion of the finger-restricting portion being formed to project from the grip portion toward the photographing lens barrel;
a concavity arranged above the finger-restricting portion and being defined by first, second and third planar surfaces, said first surface being a top surface of said finger-restricting portion, said second surface extending upward from said first surface to define an extension of said camera body front surface and said third surface extending upwardly from said first surface and forming an inside corner with said first surface and forming an inside corner with said second surface; and a control means for controlling the active type focusing means and the contrast type focusing means on the basis of a subject state and a photographing state.

16. An electronic camera, comprising:

a camera body;

a photographing lens barrel arranged at one end of the camera body, the photographing lens barrel having therein a photographing lens which can be focusing-driven;

a grip portion arranged at the other end side of the camera body and projecting outwardly from the camera body;

an image sensing device arranged behind the photographing lens in the camera body;

a contrast type focusing means for outputting focusing signals by use of subject light projected into the image sensing device;

a movable electronic flash lid forming one portion of a projecting portion which projects upwardly from the camera body and above the photographing lens barrel whereby, an electronic flash unit which is supported by the electronic flash lid is enabled to emit light by popping-up of the electronic flash lid;

a ranging unit employed as an active type focusing means disposed in the camera body;

a window for said ranging unit disposed in front of the ranging unit and at a lower part of a said front of the projecting portion; and a control means for controlling the contrast type focusing means and the active type focusing means on the basis of a subject state and a photographing state.

17. An electronic camera, comprising:

a camera body;

a photographing lens barrel arranged at one end side of the camera body, the photographing lens barrel having therein a photographing lens which can be focusing-driven;

a grip portion arranged at the other end side of the camera body and projecting outwardly from the camera body;

an image sensing device arranged behind the photographing lens in the camera body;

a contrast type focusing means for outputting focusing signals by use of subject light projected into the image sensing device;

an electronic flash unit which can emit light by popping-up of a movable electronic flash lid forming a portion of a projecting portion which projects upwardly from an upper surface of the camera body and above the photographing lens barrel, the electronic flash unit and a window for a ranging unit being supported by the electronic flash lid;

an active type focusing means arranged behind the ranging window; and a control means for controlling the contrast type focusing means and the active type focusing means on the basis of a subject state and a photographing state.

18. An electronic camera according to claim 15, 16 or 17, wherein the subject state is subject brightness or contrast, and the photographing state is a photographing state that a zooming ratio is adjusted, or photographing at close range state, and the control means selects and controls, on the basis of these, one of the first focusing means and the second focusing means.

19. An electronic camera according to claim 15, 16 or 17, wherein the subject state is subject brightness or contrast, and the photographing state is a photographing state that a zooming ratio is adjusted, or photographing at close range state, and the control means selects and controls, on the basis of these, one of the first focusing means and the second focusing means.

20. A camera comprising:

a photographing lens barrel arranged at one end side of a camera body and projecting in a forward direction from a front of the camera body;

a grip portion arranged at another end side of the camera body and projecting forward from the front of the camera body;

a projecting portion projecting upward a given amount from top of the camera body and adjacent a base portion of the photographing lens barrel;

a ranging unit window fixed on a front of the projecting portion; and an electronic flash unit fixed at the front of the projecting portion and arranged above the ranging unit window, wherein the ranging unit window and the electronic flash unit are exposed at the front of the projecting portion, the ranging window being positioned between the electronic flash unit and the base of the photographing lens barrel; and wherein the projecting portion is fixed on the camera and enables both the ranging unit and the flash unit to be constantly exposed on the exterior of the camera.

21. A camera according to claim 20, said camera being an electronic camera having an image sensing device for photoelectrically converting a subject image formed on the image sensing device by the photographing lens barrel, and further comprising:

an active type first focusing means disposed in alignment with the ranging unit window;

a contrast type second focusing means for outputting focusing signals by use of subject light projected into the image sensing device; and a control means for controlling the first focusing means and the second focusing means on the basis of a subject state and a photographing state.

22. An electronic camera, comprising:

a camera body;

a photographing lens barrel arranged near one end of the camera body and projecting outwardly from a front of the camera body, the photographing lens barrel having therein a focusing driven photographing lens;

an image sensing device arranged in the camera body and behind the photographing lens;

a first focusing device for outputting focusing signals by use of subject light projected into the image sensing device;

a grip portion arranged at another end side of the camera body and projecting outwardly from the camera body;

a projecting portion projecting upward from a top of the camera body, the projecting portion having an electronic flash lid which forms part of the projecting portion when the electronic flash unit is not used, and pops up to an operating position when the electronic flash unit is used;

the electronic flash unit which is supported by the electronic flash lid being enabled to emit light when moved to the operating position;

a second focusing device provided along a front of the projecting portion, said second focusing device being located on a subject side of the projecting portion; and a controller for controlling the first focusing device and the second focusing device based on a subject state and a photographing state.

23. The electronic camera of claim 22, wherein the first focusing means is a contrast type focusing means for outputting focusing signals by use of subject light projected into the image sensing device, and the second focusing means is a ranging unit comprised of an active type focusing means disposed behind a ranging unit window.

24. An electronic camera, comprising:

a camera body;

a photographing lens barrel arranged at one side of the camera body to project forward from a front of the camera body, the photographing lens barrel having therein a focusing-driven photographing lens;

an image sensing device arranged behind the photographing lens in the camera body;

a first focusing device for outputting focusing signals by use of subject light projected into the image sensing device;

a grip portion arranged at another side of the camera body and projecting forward from the camera body;

a projecting portion projecting upward from a top of the camera body, a part of the projecting portion popping up to an operating position to permit a flash photography;

an electronic flash unit supported by one portion of the projecting portion which pops up, the electronic flash unit being enabled to emit light when in the operating position;

a ranging unit window arranged on a front of the projecting portion;

a second focusing device arranged behind the ranging unit window; and a controller for controlling the first focusing device and the second focusing device based on a subject state and a photographing state.

25. An electronic camera according to claim 24, wherein the first focusing device is a contrast type focusing means for outputting focusing signals by use of subject light projected into the image sensing device, and the second focusing device is an active type focusing means disposed in alignment with the ranging unit window.

26. An electronic camera, comprising:

a camera body;

a photographing lens barrel arranged at one end side of the camera body, the photographing lens barrel having therein a photographing lens which can be focusing-driven;

a grip portion arranged at the other end side of the camera body and projecting forward from the camera body;

an image sensing device arranged behind the photographing lens in the camera body;

a contrast type focusing device for outputting focusing signals by use of subject light projected into the image sensing device;

a projecting portion projecting upward from a top of the camera body and above the photographing lens barrel;

an active type focusing device in the camera body;

a window for a ranging unit disposed in front of the active type focusing means, serving as the ranging unit, and fixedly arranged at a lower part of a front of the projecting portion;

an electronic flash unit fixedly arranged over the window for said ranging unit; and a controller for controlling the contrast type focusing device and the active type focusing device on the basis of a subject state and a photographing state.

27. An electronic camera, comprising:

a camera body;

a photographing lens barrel arranged at one end of the camera body, the photographing lens barrel having therein a photographing lens which can be focusing-driven;

a grip portion arranged at the other end side of the camera body and projecting outwardly from the camera body;

an image sensing device arranged behind the photographing lens in the camera body;

a contrast type focusing device for outputting focusing signals by use of subject light projected into the image sensing device;

a movable electronic flash lid forming one portion of a projecting portion which projects upwardly from a top of the camera body and above the photographing lens barrel whereby, an electronic flash unit which is supported by the electronic flash lid is enabled to emit light by popping-up of the electronic flash lid;

a ranging unit employed as an active type focusing device disposed in the camera body;

a window for said ranging unit disposed in front of the ranging unit and at a lower part of a front of the projecting portion; and a controller for controlling the contrast type focusing device and the active type focusing device on the basis of a subject state and a photographing state.

28. An electronic camera, comprising:

a camera body;

a photographing lens barrel arranged at one end side of the camera body, the photographing lens barrel having therein a photographing lens which can be focusing-driven;

a grip portion arranged at the other end side of the camera body and projecting outwardly from the camera body;

an image sensing device arranged behind the photographing lens in the camera body;

a contrast type focusing device for outputting focusing signals by use of subject light projected into the image sensing device;

an electronic flash unit which can emit light by popping-up of a movable electronic flash lid forming a portion of a projecting portion which projects upwardly from an upper surface of the camera body and above the photographing lens barrel, the electronic flash unit and a window for a ranging unit being supported by the electronic flash lid;

an active type focusing device arranged behind the ranging window; and a controller for controlling the contrast type focusing device and the active type focusing device on the basis of a subject state and a photographing state.

29. An electronic camera, comprising:

a camera body;

a photographing lens barrel arranged at a front of the camera body and projecting outwardly from the camera body toward a subject from a side of one end of the camera body, the photographing lens barrel having therein a focusing driven photographing lens;

an image sensing device arranged in the camera body and behind the photographing lens;

a first focusing device for outputting focusing signals by use of subject light projected into the image sensing device;

a grip portion arranged at another end side of the camera body and projecting outwardly from the camera body;

a projecting portion provided on the camera body and projecting upwardly from a top of the camera body and above the photographing lens barrel, the projecting portion having an electronic flash lid which forms one portion of the projecting portion when photography is not performed, and pops up to an operating position to permit flash photography;

an electronic flash unit which is supported by the electronic flash lid being enabled to emit light when in the operating position;

a second focusing device provided on a front of and on a subject side of the projecting portion; and a controller for controlling the first focusing device and the second focusing device based on a subject state and a photographing state.

30. The electronic cameral of claim 29, wherein the first focusing device is a contrast type focusing device for outputting focusing signals by use of subject light projected into the image sensing device, and the second focusing device is an active type focusing device disposed correspondingly to the ranging unit window.

31. An electronic camera, comprised of first, second and third major blocks, namely a camera body block, a photographing lens barrel unit block and a flash unit/focusing unit block, respectively;

the first block comprising a camera body;

the second block comprising a photographing lens barrel arranged at a front of the camera body and projecting away from a front face of the camera body block and toward a subject from a side of one end of the camera body block, the photographing lens barrel block having therein a focusing driven photographing lens;

an image sensing device arranged in the camera body and behind the photographing lens;

a first focusing means for outputting focusing signals by use of subject light projected into the image sensing device;

a grip portion integral with and arranged at another end side of the camera body and projecting outwardly from a front surface of the camera body;

the third block being mounted upon a top of the camera body;

the focusing unit of the third block comprising a second focusing device having a ranging unit window which is positioned above a base of the photographing lens barrel and facing the subject;

the electronic flash unit of said third block comprising an electronic flash lid positioned behind the second focusing means, the electronic flash lid fixedly supporting an electronic flash unit and exposing the electronic flash unit by popping up to move the electronic flash unit to an operating position; and a controller for controlling the first focusing device and the second focusing device based on a subject state and a photographing state.

32. The electronic camera of claim 31, wherein the first focusing means is a contrast type focusing means for outputting focusing signals by use of subject light projected into the image sensing device, and the second focusing means is an active type focusing means disposed correspondingly to the ranging unit window.

* * * * *